March 19, 1940.                L. E. BAKER                  2,193,915
               APPARATUS FOR UNDERWATER ELECTRIC BARRIER
                         Filed May 19, 1937
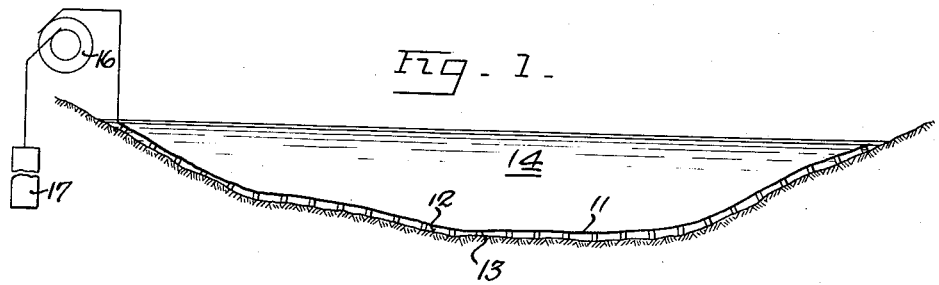
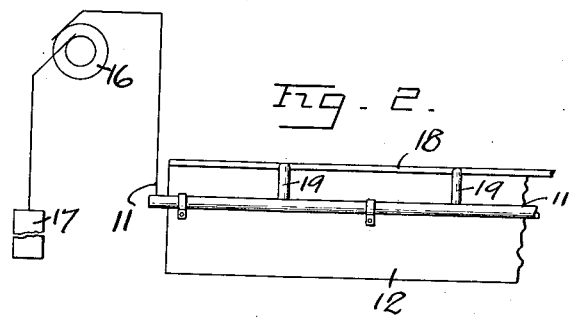  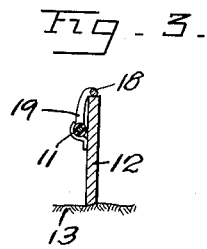
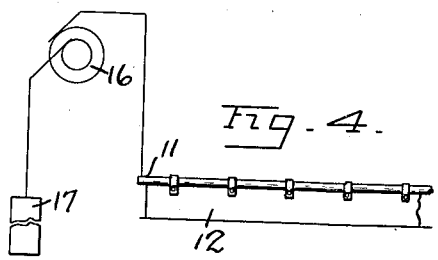  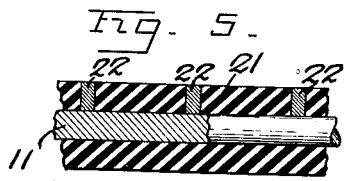  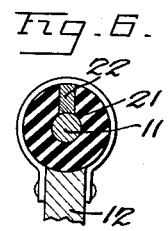
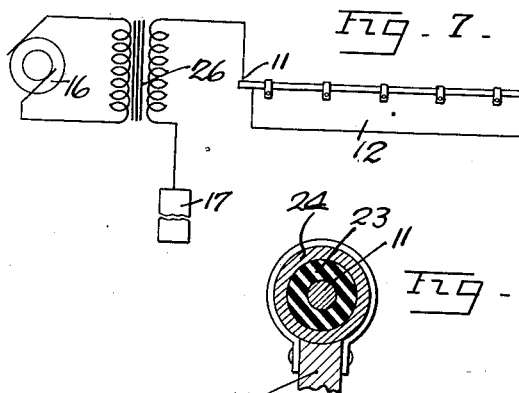  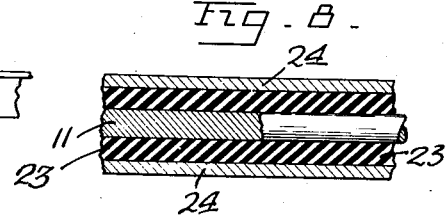
INVENTOR.
LIN E. BAKER
BY George B. White
ATTORNEY.

Patented Mar. 19, 1940

2,193,915

UNITED STATES PATENT OFFICE 2,193,915

APPARATUS FOR UNDERWATER ELECTRIC BARRIER

Lin E. Baker, San Francisco, Calif.

Application May 19, 1937, Serial No. 143,512

10 Claims. (Cl. 119—3)

This invention relates to apparatus to form an electrified zone in water.

An object of the invention is to provide an electrified zone or electric barrier in water to prevent animals, and particularly crawling marine animals, to pass through a certain area, said zone to be so formed that the electric field therein is not injurious or dangerous.

Another object of the invention is to provide a method and apparatus for forming an electrified zone in water in such a manner that a certain voltage is maintained throughout the whole length of the barrier, even in a comparatively long line, without the necessity of reducing the diameter of the conductor line or of unduly increasing the impressed voltage.

Particularly it is an object of this invention to provide an electrified zone in water which is formed by controlled discharge of electricity uniform along the length of a conductor, and which may utilize a ground connection outside of the body of water so electrified.

Another object of this invention is to provide a method and apparatus to form an electrified zone which is highly useful and simple in construction. Convenience of arrangement, lightness and comparative inexpense of manufacture are further objects which have been borne in mind in the production and development of the invention.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawing.

With the foregoing and other objects in view, which will be made manifest in the following detailed description and specifically pointed out in the appended claims, reference is had to the accompanying drawing for the illustrative embodiment of the invention, wherein:

Figure 1 is a diagrammatic view of my invention in use in a body of water.

Figure 2 is a somewhat diagrammatic and fragmental view of a specific embodiment of my invention.

Figure 3 is a sectional view of the embodiment of the invention illustrated in Figure 2.

Figure 4 is a somewhat diagrammatic and fragmental view of another embodiment of my invention.

Figure 5 is a fragmental sectional view of the conductor used in said embodiment in Fig. 4.

Figure 6 is a cross sectional view of said conductor.

The problem of preventing the passage of fish or crawling marine animals into certain zones or bodies of water presents constant difficulties especially from the points of view of dangerously strong currents and of high expense of current consumption or materials. In order to render an electrified barrier efficient and economical for the above purpose, I provide a method and barrier whereby suitably high voltages may be held in a barrier, and the discharge thereof from a conductor is so controlled that the current flow is limited to harmless but efficient quantities. This control is accomplished without increasing the size of the conductor used.

The steps involved in this method involve the charging of an underwater conductor with electricity from one terminal of a source of electricity, and coupling said conductor with the body of water by resistance, or inductance and resistance, or capacitive reactance, or inductive capacitance, or a combination of the same.

The other terminal of the source of electricity is connected to a ground which is preferably outside of said body of water but in contiguity with the banks or bottom of said body of water. The ground connection includes a conductive member of at least the same area as that of the entire underwater conductor.

Thus an electrified zone in a body of water is formed by a controlled electric field created around an immersed conductor, which field is controlled by resistances in one form. In another form the electric field is controlled by inductive-resistive coupling between the conductor and the surrounding water, with resistance preferably predominating. And in still another form said control is established by an inductive-capacitive coupling between the conductor and the water preferably capacitive reactance predominating.

In carrying out my invention in general I make use of a conductor line 11 preferably flexible, which is mounted on a flexible support 12. The support may be made of hingedly joined boards, or the like, made of such short sections that it is capable to conform to the contour of the bottom 13 of the stream or body of water 14. The boards forming the flexible support 12 are wide enough at the bottom to rest on their lower edge and they sink slightly into the bottom 13 when the latter is soft or loose, or the boards when too narrow may be provided with bottom flanges at their lower edge as a footing or bearing surface, not shown. Thus the conductor line 11 can be laid along a portion of the bottom of a body of water at a desired height from said bottom as determined by the height of the support 12. An end of the conductor line 11 is connected to a terminal of a source of electricity such as for instance an alternator 16. The other terminal or brush of the alternator 16 is connected to a suitable ground plate 17 or the like the area of which is at least equal to the total area of said conductor line 11, or the total electrode area. The ground 17 is located outside of the body of water 14, and is preferably imbedded in one of the banks of the stream or body of water, off shore. It was found in practice that the above arrangement operates satisfactorily with an electrode or conductor line 11 even longer than a mile.

In the form illustrated in Fig. 2 and Fig. 3 the electrode or conductor line 11 is insulated. In addition a bare electrode 18 is mounted on the support 12 in substantial parallelism with the conductor line 11. At spaced intervals the electrode 18 is connected to the conductor line 11 by suitable resistors 19. Each resistor 19 may consist of an insulator shell filled with resistor filler which latter extends through the insulation to the conductor line 11 at one end and is fixed in contact with the bare electrode 18 at its other end.

When the above apparatus is used in sea water, for instance as a barrier against marine animals that crawl, the spacing between adjacent resistors 19 was found best at about thirty feet, because the conductivity of salt water is very great. Of course the spacing of the resistors from each other depends on the conductivity of the water in which the device is used. The arrangement in salt water heretofore described permits the conductor to carry sufficient current to charge an electrode a mile or more in length at a voltage of 110 volts or more. The resistors 19 permit sufficient current to flow from the conductor to the bare electrode to form a field of such current density as to repel marine animals that attempt to crawl or swim over the field without however killing the animals. The flow of current in the conductor line also causes inductance in the electrode and vice versa.

In the embodiments of my invention illustrated in Fig. 4, Fig. 5, and Fig. 6, an insulation 21 around the conductor line 11 is perforated at suitably spaced intervals, so as to form spaced pockets 22, which extend from the conductor line 11 to the outside surface of the insulation 21. These pockets 22 are preferably filled with a suitable resistor material, such as a mixture of conducting and non-conducting materials mixed in such proportions as to give the desirable resistance. In practice a mixture of carbon and cement fixed in pockets about one inch apart was found to be the best connection to form a suitable barrier field against starfish in sea water. This permitted the same conductor line to carry sufficient current to charge a mile or more of barrier. It is preferable in this form that the current be intermittent for reason of economy and to prevent undue heating of the resistors. The current may be interrupted at regular intervals by any suitable automatic circuit breaker, not shown.

In all the embodiments of my invention heretofore described the main conductor wire 11 is connected to one terminal of the source of electricity, while the other terminal of the source of electricity is grounded. The conductor line and the electrode is flexible, and are flexibly mounted so as to be in substantial parallelism to the contour of the bottom of the body of water. The particular types of electrodes herein illustrated may be used in other combinations, however in the herein embodiments the electric field is not formed by flow of curent between electrodes. The conductivity of the body of water itself is used in forming the field.

Having thus described my invention what I now claim is:

1. An underwater electric barrier of the character described comprising a conductor immersed in water and connected to one terminal of a source of electricity, means to connect the other terminal of said source of electricity to the ground related to said water, and resistance means to electrically connect said conductor to the water.

2. An underwater electric barrier of the character described comprising a conductor immersed in water and connected to one terminal of a source of electricity, means to connect the other terminal of said source of electricity to the ground related to said water, and resistance means to electrically connect said conductor to the water at a plurality of areas along the length of said conductor.

3. An underwater electric barrier of the character described comprising an insulated conductor connected to one terminal of a source of electricity, a ground connection to the other terminal of said source of electricity, and resistance members in spaced relation along the length of said conductor being connected to said conductor so as to conduct electric current therefrom to the outside of the insulation of said conductor.

4. An underwater electric barrier of the character described comprising an insulated conductor connected to one terminal of a source of electricity, a ground connection to the other terminal of said source of electricity, and resistance members in spaced relation along the length of said conductor being connected to said conductor so as to conduct electric current therefrom to the outside of the insulation of said conductor, and a bare conductor immersed in the water and connected to said resistance members.

5. An underwater electric barrier of the character described comprising an insulated conductor connected to one terminal of a source of electricity, a ground connection to the other terminal of said source of electricity, and resistance members in spaced relation along the length of said conductor being connected to said conductor so as to conduct electric current therefrom to the outside of the insulation of said conductor, and means to support said conductor under water so as to be parallel with the contour of the bottom of the body of water at said barrier.

6. An underwater electric barrier of the character described comprising an insulated conductor connected to one terminal of a source of electricity, a ground connection to the other terminal of said source of electricity, and resistance members in spaced relation along the length of said conductor being connected to said conductor so as to conduct electric current therefrom to the outside of the insulation of said conductor, and a bare conductor immersed in the water and connected to said resistance members, and means to support both conductors in parallel relation to the contour of the bottom of the body of water along said barrier.

7. An underwater electric barrier of the character described comprising a conductor entirely immersed in the water so as to conform to the contour of the ground at the bottom of the water body at said barrier, a ground member of an area at least equal with the total area of said conductor, and a source of electricity having one terminal conected to said conductor, and another terminal to said ground member.

8. An underwater electric barrier of the character described comprising a conductor entirely immersed in the water so as to conform to the contour of the ground at the bottom of the water body at said barrier, a ground member of an area at least equal with the total area of said conductor, and a source of electricity having one terminal connected to said conductor and another terminal to said ground member, said ground member being placed into the ground at a shore of said water body.

9. An underwater electric barrier of the character described comprising a conductor entirely immersed in the water so as to conform to the contour of the ground at the bottom of the water body at said barrier, a ground member of an area at least equal with the total area of said conductor, and a source of electricity having one terminal connected to said conductor, and another terminal to said ground member, and a flexible support adapted to conform to the contour of the bottom of said water body on which said conductor is mounted.

10. A conductor for discharging electricity in water comprising a conductor wire, an insulation around said wire, and a plurality of resistance elements fixed into said insulation so as to extend from said wire to the outside of the insulation at spaced points along the length of said conductor.

LIN E. BAKER.